(12) United States Patent
Lindén

(10) Patent No.: US 12,526,528 B2
(45) Date of Patent: Jan. 13, 2026

(54) EXPOSURE TIME CONTROL

(71) Applicant: Tobii AB, Danderyd (SE)

(72) Inventor: Erik Lindén, Danderyd (SE)

(73) Assignee: Tobii AB, Danderyd (SE)

(*) Notice: Subject to any disclaimer, the term of this patent is extended or adjusted under 35 U.S.C. 154(b) by 485 days.

(21) Appl. No.: 16/959,045

(22) PCT Filed: Dec. 28, 2017

(86) PCT No.: PCT/EP2017/084763
§ 371 (c)(1),
(2) Date: Apr. 27, 2023

(87) PCT Pub. No.: WO2019/129353
PCT Pub. Date: Jul. 4, 2019

(65) Prior Publication Data
US 2024/0187738 A1    Jun. 6, 2024

(51) Int. Cl.
*G06K 9/00* (2022.01)
*H04N 23/611* (2023.01)
(Continued)

(52) U.S. Cl.
CPC ........... *H04N 23/73* (2023.01); *H04N 23/611* (2023.01); *H04N 23/20* (2023.01)

(58) Field of Classification Search
CPC ...... H04N 23/73; H04N 23/611; H04N 23/20; H04N 23/71; H04N 23/56; H04N 25/133; A61B 3/113; G06F 3/013
See application file for complete search history.

(56) References Cited

U.S. PATENT DOCUMENTS

| | | | | |
|---|---|---|---|---|
| 4,950,069 | A | * | 8/1990 | Hutchinson ............ G06V 40/19 396/51 |
| 2015/0199559 | A1* | | 7/2015 | Sztuk ...................... G06F 3/013 348/78 |

(Continued)

FOREIGN PATENT DOCUMENTS

| | | |
|---|---|---|
| CN | 1725976 A | 1/2006 |
| CN | 103491312 A | 1/2014 |
| WO | 2009124136 A1 | 10/2009 |

OTHER PUBLICATIONS

Chinese search report in the appl. nr. 201780098308.6 dated Oct. 28, 2023.

(Continued)

*Primary Examiner* — Howard D Brown, Jr.
(74) *Attorney, Agent, or Firm* — Christopher Ignatius Moylan

(57) ABSTRACT

A method of controlling exposure time is disclosed comprising receiving an image of an eye from an image sensor, the image resulting from the image sensor detecting light during a first exposure time. A pupil intensity is determined as an intensity of a representation of a pupil of the eye in the image and an iris intensity is determined as an intensity of a representation of an iris of the eye in the image. Furthermore, a pupil-iris contrast is determined as a contrast between the representation of the pupil in the image and the representation of the iris in the image. On a condition that the pupil intensity is determined to meet an intensity condition, an intensity compensated exposure time is determined which is different from the first exposure time, and on a condition that the pupil-iris contrast is determined to meet a contrast condition, a contrast compensated exposure time is determined which is different from the first exposure time. Furthermore, a second exposure time is set based on any (Continued)

determined intensity compensated exposure time and any determined contrast compensated exposure time.

13 Claims, 3 Drawing Sheets

(51) Int. Cl.
*H04N 23/73* (2023.01)
*H04N 23/20* (2023.01)

(56) References Cited

U.S. PATENT DOCUMENTS

2016/0227113 A1* 8/2016 Horesh ................. H04N 23/611
2024/0187738 A1* 6/2024 Lindén ................. H04N 23/611

OTHER PUBLICATIONS

International Search Report (WO2019129353) in relation to PCT/EP2017/084763, published on Jul. 19, 2019.

* cited by examiner

EXPOSURE TIME CONTROL

TECHNICAL FIELD

The present disclosure generally relates to the field of eye tracking. In particular, the present disclosure relates to systems and methods for use in controlling exposure time when capturing an image of an eye.

BACKGROUND

In eye tracking applications, digital images are retrieved of the eyes of a user and the digital images are analyzed in order to estimate the gaze direction of the user. There are different methods for achieving such an estimation. In some methods ambient light is used when retrieving images of the eyes of the user and in some methods additional light sources (illuminators) are used to illuminate the eyes for retrieving images of the eyes of the user. Generally, the estimation of the gaze is based on identification of the pupils of the eyes of the user, together with identification of glints (corneal reflections) in the eyes of the user. In order to identify a pupil of an eye in an image of the eye, the contrast between a representation of the pupil and a representation of an iris of the eye in the image must be sufficient.

One known method of eye tracking includes the use of infrared light and an image sensor. The infrared light is directed towards the pupil of a user and the reflection of the light is captured by an image sensor. Through analysis of the reflection point, the direction of the user's gaze may be calculated. One such system is described in U.S. Pat. No. 7,572,008 (which is hereby incorporated by reference in its entirety).

In another know method disclosed in US 2015/0199559, eye features including a pupil and an iris and corneal reflections (glints) from light sources identified in a captured image of an eye are used for eye tracking. In the method, eye tracking software may detect one or more pupils and irises and may adjust a camera exposure time based on the contrast between pupils and irises in order to optimize detection in subsequent images.

Still, the result of some factors that potentially cause difficulty of determination of gaze direction remain in known method and systems based on identification of the pupils of the eyes of the user together with identification of glints. For example, in some situations, identification of glints can become difficult or impossible.

It would be desirable to provide further systems and methods addressing one or more of the issues with known systems and methods.

SUMMARY

An object of the present disclosure is to address at least one of the issues with known systems and methods.

According to a first aspect, there is provided a method of controlling exposure time comprising receiving an image of an eye from an image sensor, the image resulting from the image sensor detecting light during a first exposure time. A pupil intensity is determined as an intensity of a representation of a pupil of the eye in the image and an iris intensity is determined as an intensity of a representation of an iris of the eye in the image. A pupil-iris contrast is then determined as a contrast between the representation of the pupil in the image and the representation of the iris in the image. On a condition that the pupil intensity is determined to meet an intensity condition, an intensity compensated exposure time is determined which is different from the first exposure time, and on a condition that the pupil-iris contrast is determined to meet a contrast condition, a contrast compensated exposure time is determined which is different from the first exposure time. Furthermore, a second exposure time is set based on any determined intensity compensated exposure time and any determined contrast compensated exposure time.

As indicated above, some factors that may potentially cause difficulty of determination of gaze direction remain in known method and systems based on identification of the pupils of the eyes of the user together with identification of glints. For example, in applications where gaze direction is based on identification of pupils of at least one eye of a user and of glints (corneal reflections), a too high intensity may result in a situation where any glints appearing in the representation of the pupil in the image will be difficult or impossible to identify because the intensity of the representation of the pupil itself in the image will be the same or near the intensity of the representation of the glints on the representation of the pupil in the image. Determining an intensity compensated exposure time on a condition that an intensity condition is met by the pupil intensity and determining a contrast compensated exposure time on a condition that a contrast condition is met by the pupil-iris contrast, and then setting a second exposure time based on any intensity compensated exposure time and any contrast compensated exposure time, will enable control both on the basis of an intensity condition and a contrast condition.

The image sensor can be any type of imaging sensor such as an image sensor consisting of an integrated circuit containing an array of pixel sensors, each pixel containing a photodetector and an active amplifier. The image sensor is capable of converting light into digital signals. In reality, as an example, it could be Infrared image sensor or IR image sensor RGB sensor RGBW sensor RGB or RGBW sensor with IR filter A shutter mechanisms of the image sensor can be either rolling shutter or global shutter. The shutter mechanism can be a mechanical mechanism or it may be an electronic shutter or a combination thereof. In alternative, no shutter is used and the exposure time is controlled by controlling illumination time by controlling the time one or more illuminators illuminate the eye, or any other suitable way.

The eye may for example be illuminated by one or more illuminators, which may for example be light sources such as light emitting diodes and the light emitted may be visible light or infrared light.

Exposure time is herein a time duration which an image sensor detects light in order to capture an image. A set exposure time can for example be achieved by either controlling a shutter at the image sensor (or anywhere between the image sensor and the eye to be captured in an image) to open up and then be open for the duration of the set exposure time and then close. In alternative to using a shutter at the image sensor, the set exposure time may be achieved by means of controlling one or more illuminators for illuminating the eye such that reflections from the eye will be detectable by the image sensor. The exposure time is then controlled by controlling the illuminators to be switched on for the duration of the set exposure time and then to be switched of. Any way of controlling exposure time by controlling a shutter, illuminators or other for achieving an image resulting from light detected by the image sensor during a determined exposure time may be used.

In embodiments the second exposure time is set as the shorter of any determined intensity compensated exposure time and any determined contrast compensated exposure time.

By selecting the shorter of the two possible compensated exposure times, the risk that a compensation based on a desired contrast will result in an exposure time that will push the pupil intensity to become too high will be reduced. For example, in applications where gaze direction is based on identification of the pupil and of glints (corneal reflections), a too high intensity may result in any glints appearing in the representation of the pupil in the image will be difficult or impossible to identify because the intensity of the representation of the pupil itself in the image will be the same or near the intensity of the representation of the glints on the representation of the pupil in the image.

According to some embodiments, the pupil intensity is determined by sampling pupil pixel intensity values of the image relating to pixels of a peripheral region of a representation of the pupil in the image bordering on the representation of the iris in the image. The pupil intensity is then determined as a mean of at least a subset of the sampled pupil pixel intensity values. By sampling pixels of the peripheral region of the representation of the pupil in the image, the most relevant part of the pupil in relation to contrast between the representations of the pupil and the iris in the image are used for contrast determination. The peripheral region may for example be defined as an area between a first circle with a radius equal to the radius of the pupil and a second circle with a smaller radius which is concentric with the first circle. The subset used for determining the pupil intensity are preferably a subset which is representative of the pupil intensity in the peripheral region in relation to contrast to the iris intensity.

According to some embodiments, the iris intensity is determined by sampling iris pixel intensity values of the image relating to pixels of a peripheral region of a representation of the iris in the image bordering on the representation of the pupil in the image. The iris intensity is then determined as a mean of at least a subset of the sampled iris pixel intensity values. By sampling pixels of the peripheral region of the representation of the iris in the image, the most relevant part of the iris in relation to contrast between the representations of the iris and the pupil in the image are used for contrast determination. The peripheral region may for example be defined as an area between a first circle with a radius equal to the radius of the pupil and a second circle with a larger radius which is concentric with the first circle. The subset used for determining the iris intensity are preferably a subset which is representative of the iris intensity in the peripheral region in relation to contrast to the pupil intensity.

According to some embodiments the at least a subset of the sampled pupil pixel intensity values is a predetermined percentage of the sampled pupil pixel intensity values having lowest intensity values. The sampled pupil pixel intensity values may for example be ordered in a histogram according to increasing intensity values. A top percentage are then filtered off and a mean is calculated on the remaining sampled pupil pixel intensity values.

According to some embodiments the at least a subset of the sampled iris pixel intensity values is a predetermined percentage of the sampled iris pixel intensity values having lowest intensity values. The sampled iris pixel intensity values may for example be ordered according to increasing intensity values. A top percentage are then filtered off and a mean is calculated on the remaining sampled iris pixel intensity values. Any way of identifying a top percentage may be used.

According to some embodiments, on a condition that the pupil intensity is determined to be above a first intensity threshold, an intensity compensated exposure time is determined that is shorter than the first exposure time by a predetermined decrement. The first intensity threshold is set such that intensities above the first intensity threshold indicates saturation. In case of saturation of the representation of the pupil in the image or at least a subset thereof, i.e. a case where the amount of light detected by the image sensor is outside the image sensor's dynamic range, any representations of glints in the representation of the pupil or the subset of the representation of the pupil being saturated will be difficult or impossible to identify in the image. In case of saturation the amount of light detected by the image sensor is outside the dynamic range of the image sensor, and hence it is not possible to know how much the exposure time has to be shortened in order to achieve an intensity value within the dynamic range of the sensor. The intensity compensated exposure time is thus preferably determined to be a predetermined decrement shorter than the first exposure time.

Furthermore, on a condition that the pupil intensity is determined to be below the first intensity threshold and above a second intensity condition threshold, an intensity compensated exposure time is determined that is shorter than the first exposure time. A quotient between the intensity compensated exposure time and the first exposure time is proportional to the quotient between the second intensity threshold and the pupil intensity. In a case when the pupil intensity is determined to be below the first intensity threshold there is no indication of saturation. This is a case where the amount of light detected by the image sensor is within the dynamic range of the image sensor and the exposure time is shortened using proportional control if the pupil intensity is above a second intensity threshold. The second intensity threshold preferably indicates a desired intensity value.

According to some embodiments, on a condition that the pupil-iris contrast is determined to be above a contrast threshold, a contrast compensated exposure time is determined which is shorter than the first exposure time. Furthermore, on a condition that the pupil-iris contrast is determined to be below the contrast threshold, a contrast compensated exposure time is determined which is longer than the first exposure time. The contrast threshold preferably indicates a desired contrast which is sufficient for identification of the representation of the pupil in the image or at least will provide a desired precision in gaze tracking. In case one or more illuminators is used during the exposure time, the pupil-iris contrast is preferably not higher than the contrast threshold indicating a sufficient contrast, since higher contrast will require longer exposure time which in turn will require longer time for the one or more illuminators to be switched leading to unnecessary power consumption.

According to some embodiments a quotient between the contrast compensated exposure time and the first exposure time is proportional to the quotient between the contrast threshold and the pupil-iris contrast.

According to some embodiments a quotient between the contrast compensated exposure time and the first exposure time is equal to the quotient between the contrast threshold and the pupil-iris contrast. In other words, the relation between the exposure time and pupil-iris contrast is approximated as proportional.

According to some embodiments the pupil-iris contrast is determined as an absolute value of a difference between the pupil intensity and the iris intensity.

According to some embodiments the method further comprises limiting the second exposure time such that an absolute value of the difference between the second exposure time and the first exposure time is equal to or below an exposure time change limit. In order to reduce the risk of changing the exposure time too much such that the exposure time needs to be changed back, the amount of the change of exposure time is limited.

According to some embodiments the pupil intensity is higher than the iris intensity. This relates to situations where the representation of the pupil appears brighter than the representation of the iris in the image. The situations relate to bright pupil illumination periods where one or more illuminators arranged coaxially with (or close to) the image sensor in relation to the eye are switched on so that light reflected from a retina of the eye returns back out through the pupil towards the image sensor, so that the pupil appears brighter than the iris surrounding it.

According to some embodiments, the method further comprises, on a condition that the iris intensity is determined to meet an iris intensity condition, determining an iris intensity compensated exposure time which is different from the first exposure time. The second exposure time is then further based on any determined iris compensated exposure time. For example, the second exposure time is set as the shorter of any determined intensity compensated exposure time, any iris intensity compensated exposure time and any determined contrast compensated exposure time.

In alternative the condition on the iris intensity may even replace the condition on the pupil intensity resulting in provision of a method of controlling exposure time comprising receiving an image of an eye from an image sensor, the image resulting from the image sensor detecting light during a first exposure time. A pupil intensity is determined as an intensity of a representation of a pupil of the eye in the image and an iris intensity is determined as an intensity of a representation of an iris of the eye in the image. A pupil-iris contrast is then determined as a contrast between the representation of the pupil in the image and the representation of the iris in the image. On a condition that the iris intensity is determined to meet an iris intensity condition, an iris intensity compensated exposure time is determined which is different from the first exposure time, and on a condition that the pupil-iris contrast is determined to meet a contrast condition, a contrast compensated exposure time is determined which is different from the first exposure time. Furthermore, a second exposure time is set based on any determined iris intensity compensated exposure time and any determined contrast compensated exposure time.

According to a second aspect, there is provided an eye tracking system comprising circuitry configured to receive an image of an eye from an image sensor, the image resulting from the image sensor detecting light during a first exposure time. The circuitry is further configured to determine a pupil intensity as an intensity of a representation of a pupil of the eye in the image and determine an iris intensity as an intensity of a representation of an iris of the eye in the image. The circuitry is further configured to determine a pupil-iris contrast as a contrast between the representation of the pupil in the image and the representation of the iris in the image. The circuitry is further configured to, on a condition that the pupil intensity is determined to meet an intensity condition, determine an intensity compensated exposure time is determined which is different from the first exposure time, and on a condition that the pupil-iris contrast is determined to meet a contrast condition, determine a contrast compensated exposure time which is different from the first exposure time. The circuitry is further configured to set a second exposure time based on any determined intensity compensated exposure time and any determined contrast compensated exposure time.

Embodiments of the eye tracking system according to the second aspect may for example include features corresponding to the features of any of the embodiments of the method according to the first aspect.

According to a third aspect, one or more computer-readable storage media storing computer-executable instructions are provided that, when executed by a computing system that implements eye/gaze data processing, cause the computing system to perform the method of the first aspect.

Embodiments of the one or more computer-readable storage media according to the third aspect may for example include features corresponding to the features of any of the embodiments of the method according to the first aspect.

The one or more computer-readable media may for example be one or more non-transitory computer-readable media.

It is noted that embodiments of the invention relate to all possible combinations of features recited in the claims.

BRIEF DESCRIPTION OF THE DRAWINGS

Exemplifying embodiments will be described below with reference to the accompanying drawings.

All the figures are schematic and generally only show parts which are necessary in order to elucidate the respective embodiments, whereas other parts may be omitted or merely suggested.

DETAILED DESCRIPTION

Figure 1:
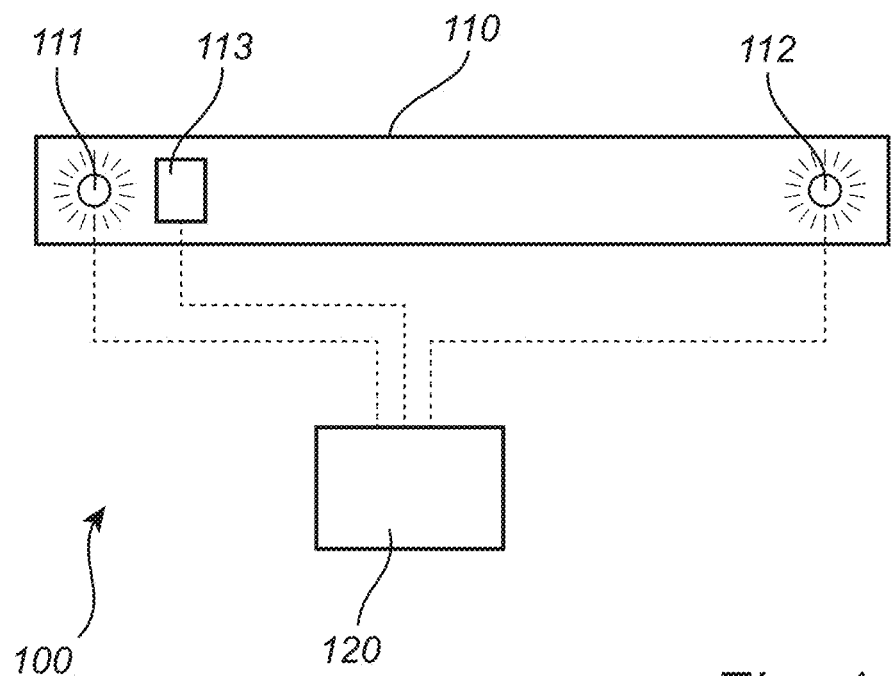
FIG. 1 shows a view of an eye tacking system, in which embodiments may be implemented.

FIG. 1 shows a simplified view of an eye tacking system 100 (which may also be referred to as a gaze tracking system) in which embodiments of the invention may be implemented. The system 100 comprises an eye tracking module 110, a first illuminator 111 and a second illuminator 112 for illuminating the eyes of a user, and a light sensor (image sensor) 113 for capturing images of the eyes of the user. The first illuminator and the second illuminator 112 may for example be light emitting diodes emitting light in the infrared frequency band, or in the near infrared frequency band. The image sensor 113 may for example be an image sensor, such as a complementary metal oxide semiconductor (CMOS) image sensor or a charged coupled device (CCD) image sensor.

The first illuminator 111 is arranged coaxially with (or close to) the image sensor 113 so that the image sensor 113 may capture bright pupil images of a user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. The second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The first illuminator 111 and the second illuminator 112 may for example take turns to illuminate the eye, so that every second image is a bright pupil image, and every second image is a dark pupil image.

The eye tracking system 100 also comprises circuitry 120 (for example including one or more processors) for processing the images captured by the image sensor 113. The circuitry 120 may for example be connected to the image sensor 113 and the first illuminator 111 and the second illuminator 112 via a wired or a wireless connection and be co-located with the image sensor 113 and the first illuminator 111 and second illuminator 112 or located at a distance, e.g. in a different device. In another example, circuitry 120 in the form of one or more processors may be provided in one or more stacked layers below the light sensitive surface of the image sensor 113.

Figure 2:
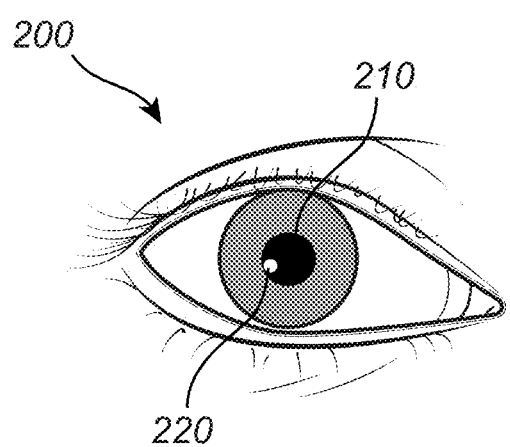
FIG. 2 shows an example image of an eye.

FIG. 2 shows an example of an image of an eye, captured by an image sensor, for example the image sensor 113 in FIG. 1, by collecting light during a first exposure time. A circuitry, for example the circuitry 120 in FIG. 1, may employ image processing (such as digital image processing) for extracting features in the image. The circuitry may employ pupil center cornea reflection (PCCR) eye tracking to determine where the eye 200 is looking. In PCCR eye tracking, a processor, for example the processor 120 in FIG. 1, estimates the position of the center of a representation of the pupil 210 in the image and the position of the center of a representation of a glint 220 at the representation of the eye 200 in the image. The representation of the glint 220 is caused by reflection of light from one or more illuminators, for example one of the first illuminator 111 and the second illuminator 112 in FIG. 1. The processor calculates where the user is in space using the representation of the glint 220 and where the user's eye is pointing using the representation of the pupil 210. Since there is typically an offset between the optical center of the eye 200 and the fovea, the processor performs calibration of the fovea offset to be able to determine where the user is looking. Gaze directions obtained from the left eye and from the right eye may then be combined to form a combined estimated gaze direction (or viewing direction). The image has been captured when one or more illuminators, for example the second illuminator 112 in FIG. 1, being arranged non-coaxially with (or far from) the image sensor in relation to the eye, illuminate the eye during the first exposure time.

In the eye tracking system described with reference to FIG. 1, the illuminators 111 and 112 are arranged in an eye tracking module 110 placed below a display watched by the user. This arrangement serves only as an example. It will be appreciated that more or less any number of illuminators and image sensors may be employed for eye tracking, and that such illuminators and image sensors may be distributed in many different ways relative to displays watched by the user. It will be appreciated that the eye tracking scheme described in the present disclosure may for example be employed for wearable eye tracking (for example in a personal computer, a smart phone, or integrated in a vehicle) or for wearable eye tracking (such as in virtual reality glasses or augmented reality glasses).

A contrast between the pupil and the iris depends both on the reflection of the iris and the bright pupil effect of the user. The bright pupil effect may differ significantly depending on user and on eye tracker geometry, but may also differ for several other reasons. This means that the pupil-iris contrast may for example be low at one eye all the time, or the pupil-iris contrast may be sufficient at both eyes but may suddenly become insufficient for one eye or both eyes. The bright pupil effect may for example disappear for certain angles. When there is low contrast (or no contrast) between the pupil and the iris, it may be difficult to detect the pupil, whereby it will become difficult to determine the gaze direction correctly.

The contrast between the pupil and the iris also specifically depends on exposure time. Exposure time is herein a time duration which an image sensor, for example the image sensor 113 in FIG. 1, detects light in order to capture an image. A set exposure time can for example be achieved by either controlling a shutter at the image sensor to open up and then be open for the duration of a set exposure time and then close. In alternative to using a shutter at the image sensor, the determined exposure time may be achieved by means of controlling one or more illuminators, for example the first illuminator 111 and/or the second illuminator 112 in FIG. 1, for illuminating an eye such that reflections from the eye will be detectable by the image sensor. The exposure time is then controlled by controlling the illuminators to be switched on stay on for the duration of the determined exposure time and then to be switched of. Any way of controlling exposure time by controlling a shutter, illuminators or other for achieving an image resulting from light detected by the image sensor during a determined exposure time may be used.

It is to be noted that even if a shutter is used to control the exposure time, one or more illuminators may still be used for illumination. The one or more illuminators may then be switched on continuously or only during a set exposure time or an interval including the set exposure time or in any other way as long as the image sensor will receive light from the illuminators during the exposure time. In case a shutter is used, exposure time is sometimes also referred to as shutter speed.

Figure 3:
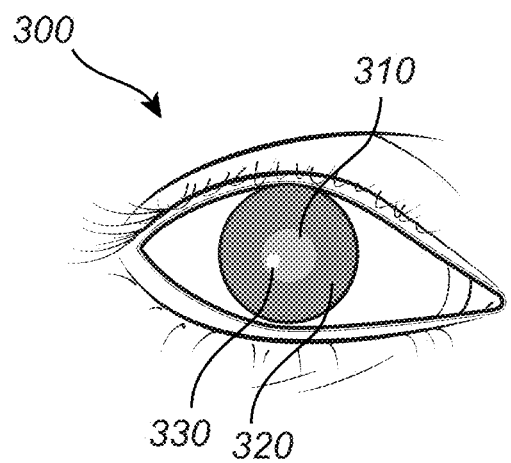
FIG. 3 shows an example of a bright pupil image.

FIG. 3 shows an example of an image of an eye captured by an image sensor, for example the image sensor 113 in FIG. 1, by collecting light during a first exposure time. A representation of a pupil 310 of a representation of the eye 300 is clearly visible as a bright spot in the image. The representation of the pupil 310 as a bright spot is due to one or more illuminators, for example the first illuminator 111 in FIG. 1, illuminating the eye during the first exposure time, being arranged coaxially with (or close to) the image sensor in relation to the eye. Light from the one or more illuminators passing through the pupil and reflected from the retina of the eye returns back out through the pupil towards the image sensor, so that the representation of the pupil 310 appears brighter than a representation of an iris 320 surrounding the representation of the pupil 310 in the image when the one or more coaxially arranged illuminators illuminate the eye. Although the representation of the pupil 310 appears a bright spot in the image, the intensity of the representation of the pupil 310 in the image is still lower than the intensity of a representation of a glint 330 in the image such that the representation of the glint 330 in the image is visible in the representation of the pupil 310 in the image.

Figure 4:
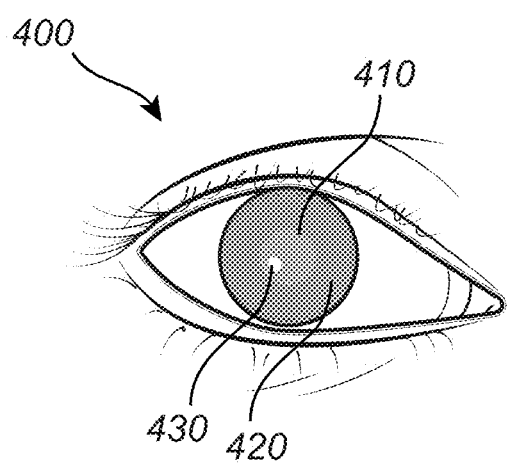
FIG. 4 shows another example of a bright pupil image where the representation of the pupil is saturated in the image.

FIG. 4 shows an example of an image of an eye captured by an image sensor, for example the image sensor 113 in FIG. 1, by collecting light during a first exposure time. A representation of a pupil 410 of a representation of the eye 400 in the image is not possible to reliably identify due to low pupil-iris contrast in the image, and hence not possible to produce reliable eye/gaze tracking data. Although the representation of the pupil 410 is more or less impossible to identify in the image, the intensity of the representation of the pupil 410 in the image is still lower than the intensity of a representation of a glint 430 in the image such that the representation of a glint 430 in the image is visible in the image. The image has been captured when one or more illuminators, being arranged coaxially with (or close to) the image sensor in relation to the eye, illuminate the eye during the first exposure time. The one or more illuminators may for example the first illuminator 111 in FIG. 1.

Figure 5:
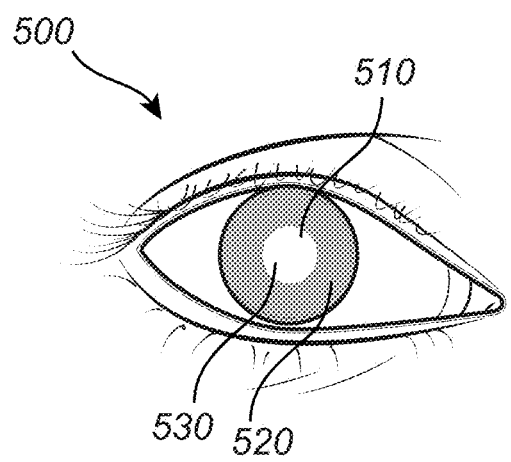
FIG. 5 shows an example of a dark pupil image.

FIG. 5 shows an example of an image of an eye captured by an image sensor, for example the image sensor 113 in FIG. 1, by collecting light during a first exposure time, where a representation of a pupil 510 of a representation the eye 500 in the image is saturated, i.e. the light collected at the image sensor during the first exposure time reflected from the pupils of the eye is outside the dynamic range of the image sensor. This is illustrated in the image as the representation of the pupil 510 in the image being completely white. Any representation of a glint 530 in the representations of the pupil 510 cannot be identified as the light detected from such glints is hidden as a result of the saturation in relation to the representation to the pupil 510. The image has been captured when one or more illuminators, being arranged coaxially with (or close to) the image sensor in relation to the eye, illuminate the eye during the first exposure time. The one or more illuminators may for example the first illuminator 111 in FIG. 1.

Figure 6:
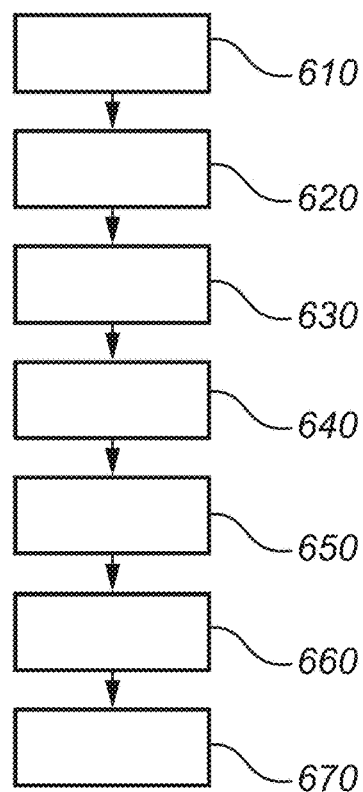
FIGS. 6-8 are flow charts of a methods according to embodiments.

FIG. 6 shows a method of controlling exposure time according to an embodiment. An image of an eye is received 610 from an image sensor, the image resulting from the image sensor detecting light during a first exposure time. A pupil intensity is determined 620 as an intensity of a representation of a pupil of the eye in the image and an iris intensity is determined 630 as an intensity of a representation of an iris of the eye in the image. Furthermore, a pupil-iris contrast is determined 640 as a contrast between the representation of the pupil in the image and the representation of the iris in the image. On a condition that the pupil intensity is determined to meet an intensity condition, an intensity compensated exposure time is determined 650 which is different from the first exposure time, and on a condition that the pupil-iris contrast is determined to meet a contrast condition, a contrast compensated exposure time is determined 660 which is different from the first exposure time. Furthermore, a second exposure time is set 670 based on any determined intensity compensated exposure time and any determined contrast compensated exposure time.

Figure 7:
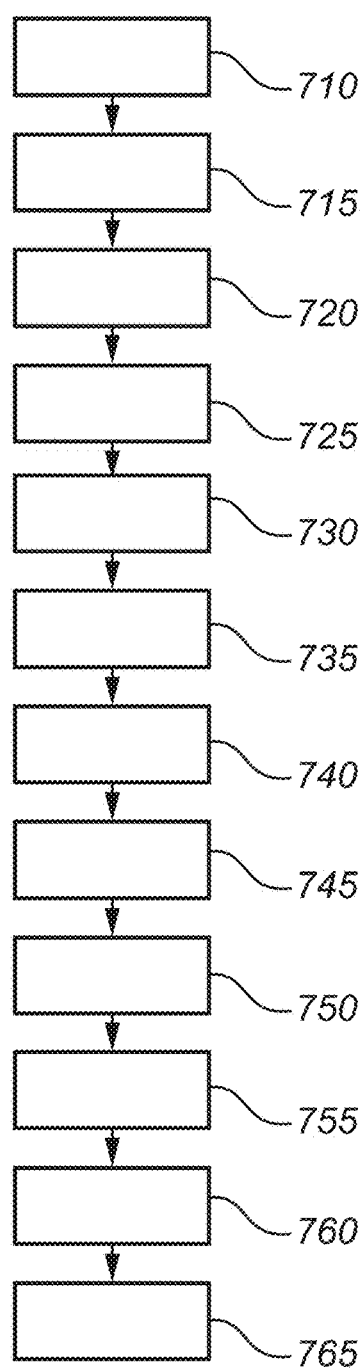

FIG. 7 shows a method of controlling exposure time according to another embodiment. An image of an eye is received 710 from an image sensor, for example the image sensor 113 in FIG. 1, the image resulting from the image sensor detecting light during a first exposure time. The image has been captured in a set up where one or more illuminators, for example the first illuminator 111 in FIG. 1, arranged coaxially with (or close to) the image sensor in relation to the eye, illuminate the eye during the firsts exposure time such that a representation of a pupil of the eye in the image is brighter than a representation of an iris of the eye in the image. The method may be performed using a circuitry, for example the circuitry 120 in FIG. 1, configured to perform the method.

A pupil intensity is determined by sampling 715 pupil pixel intensity values of the image relating to pixels of a peripheral region of a representation of the pupil in the image, the peripheral region bordering on the representation of the iris in the image. The peripheral region is for example selected as a region of the representation of the pupil in the image from a circle with a radius equal to the radius of the representation of the pupil in the image and a circle with a smaller radius, such that the selected region forms a circular band at the periphery of the representation of the pupil in the image bordering on the representation of the iris in the image.

The pupil intensity is then determined 720 as a mean of a subset of the sampled pupil pixel intensity values. The subset is a predetermined percentage of the sampled pupil pixel intensity values being lowest. The sampled pupil pixel intensity values may for example be ordered in a histogram according to increasing intensity values. A top percentage, e.g. 0-50%, are then filtered off and a mean is calculated on the remaining sampled pupil pixel intensity values. By filtering off the highest intensity values from the sampled pupil pixel intensity values, for example intensity values relating to glints will be filtered off. Such filtering is beneficial since portions of the representation of the pupil in the image including representations of glints will increase the mean of all pupil pixel intensity values if not filtered off. However, the occurrence of representations of glints in the representation of the pupil will not be correspondingly detrimental to the possibility to identify the representation of the pupil as long as sampled pixel intensity values not relating to glints and other local high intensity areas provide sufficient contrast in relation to the iris. Hence, calculation of a mean where pupil pixel intensity values relating to glints will provide a useful value of the pupil intensity in relation to contrast in relation to the representation of the iris in the image.

An iris intensity is determined by sampling 725 iris pixel intensity values of the image relating to pixels of a peripheral region of a representation of the iris in the image, the peripheral region bordering on the representation of the pupil in the image. The peripheral region is selected as a region of the representation of the iris in the image from a circle with a radius equal to the radius of the representation of the pupil or slightly larger in the image and a circle with a larger radius such that the selected region forms a circular band at the periphery of the representation of the iris in the image bordering on the representation of the pupil in the image.

The iris intensity is then determined 730 as a mean of a subset of the sampled iris pixel intensity values. The subset is a predetermined percentage of the sampled iris pixel intensity values being lowest. The sampled iris pixel intensity values may for example be ordered in a histogram according to increasing intensity values. A top percentage are then filtered off and a mean is calculated on the remaining sampled iris pixel intensity values. By filtering off the highest intensity values from the sampled iris pixel intensity values, for example intensity values relating to glints will be filtered off. Such filtering is beneficial since portions of the representation of the iris in the image including glints will increase the mean of all iris pixel intensity values if not filtered off. However, the occurrence of glints in the representation of the iris will not be correspondingly detrimental to the possibility to identify the representation of the pupil as long as sampled pixel intensity values not relating to glints and other local high intensity areas provide sufficient contrast in relation to the pupil. Hence, calculation of a mean where iris pixel intensity values relating to glints will provide a useful value of the iris intensity in relation to contrast in relation to representation of the pupil in the image.

A pupil-iris contrast is determined 735 as the absolute value of the difference between the pupil intensity and the iris intensity.

The pupil intensity is then compared to a first intensity threshold, and if the pupil intensity is determined to be above the first intensity threshold, an intensity compensated exposure time is determined 740 that is shorter than the first exposure time by a predetermined decrement. The first intensity threshold is set such that intensities above the first intensity threshold indicates saturation. For example, in digital image processing, intensity measured by ab image sensor can be in the interval [0, 255] where 0 indicates that no light is detected at the image sensor and 255 indicates the upper border for the dynamic range of the image sensor, i.e. the limit over which the sensor cannot discriminate between two different intensities. Even though the intensity value can be up to 255, the first intensity limit is preferably set to a value lower than 255, such as 250, to encompass that the maximum value for a pixel at saturation will never be higher than 255 whereas some pixels may be substantially lower than 255 which will affect the mean. The value of the first intensity threshold should be set such that pupil intensities, as calculated in the specific application, over the first limit indicate saturation.

In case of saturation of the representation of the pupil in the image or at least a subset thereof, i.e. a case where the amount of light detected by the image sensor is outside its dynamic range, any representations of glints in the representation of the pupil or the subset of the representation of the pupil being saturated will be difficult or impossible to identify in the image (see e.g. FIG. 5). In case of saturation the amount of light detected by the image sensor is outside the dynamic range of the image sensor, and hence it is not possible to know how much the exposure time has to be shortened in order to achieve an intensity value within the dynamic range of the sensor. Hence, the intensity compensated exposure time is preferably determined to be a predetermined amount shorter than the first exposure time.

If the pupil intensity is determined to be below the first intensity threshold, and hence, the pupil intensity does not indicate saturation, the pupil intensity is compared to a second intensity threshold. If the pupil intensity is above the second intensity threshold, an intensity compensated exposure time is determined 745 that is shorter than the first exposure time. The intensity compensated exposure is then set using proportional control such that a quotient between the intensity compensated exposure time and the first exposure time is proportional to the quotient between the second intensity threshold and the pupil intensity.

When the pupil intensity is determined to be below the first intensity threshold there is no indication of saturation. This is a case where the amount of light detected by the image sensor is within the dynamic range of the image sensor and the exposure time is shortened using proportional control if the pupil intensity is above a second intensity threshold. The second intensity threshold preferably indicates a desired intensity value.

The determining of the intensity compensated exposure time for the case where proportional control is used, i.e. below the first intensity threshold but above the second intensity threshold, may be complemented with a damping factor such that the absolute value of the change in exposure time from the first exposure time to the intensity compensated exposure time is limited to a certain percentage of the absolute value of the change determined according to proportional control.

Since the conditions for determining an intensity compensated exposure time is that the pupil intensity is determined to be above a first intensity threshold or above a second intensity threshold which is lower than the first intensity threshold, no intensity compensated exposure time will be determined if the pupil intensity is determined to be equal or lower than to the second intensity threshold. The second intensity threshold is a target maximum value for the intensity. The second intensity threshold may be set to a value where a change in the scene (such as a shifting gaze direction or pupil size) will not likely drive the representation of the pupil in an image into saturation before the controller can respond. The value of the second intensity threshold depends on several different parameters, such as but not limited to frame rate and controller response rate.

The pupil-iris contrast is then compared to a contrast threshold. If the pupil-iris contrast is determined to be above a contrast threshold, a contrast compensated exposure time is determined 750 which is shorter than the first exposure time.

If the pupil-iris contrast is determined to be below the contrast threshold, a contrast compensated exposure time is determined 755 which is longer than the first exposure time.

The contrast compensated exposure time is determined using proportional control such that a quotient between the contrast compensated exposure time and the first exposure time is proportional to the quotient between the contrast threshold and the pupil-iris contrast.

The determining of the contrast compensated exposure time may be complemented with a damping factor such that the absolute value of the change in exposure time from the first exposure time to the contrast compensated exposure time is limited to a certain percentage of the absolute value of the change determined according to proportional control.

Since the conditions for determining a contrast compensated exposure time is that the pupil-iris contrast is determined to be above or below the contrast threshold, no contrast compensated exposure time will be determined if the pupil-iris contrast is determined to be equal to the contrast threshold. The contrast threshold is hence the target value for the contrast. Selection of the contrast threshold is normally based on a trade-off between provision of sufficient contrast and keeping the exposure time as short as possible such that the illumination of the one or more illuminators is as short as possible in order to save power consumption.

A second exposure time is set 760 as the shorter of any determined intensity compensated exposure time and any determined contrast compensated exposure time. By selecting the shorter of the two possible compensated exposure times, the risk that a compensation based on a desired contrast will result in an exposure time that will push the pupil intensity to become too high will be reduced. For example, in applications where gaze direction is based on identification of the pupil and of glints (corneal reflections), a too high intensity may result in any glints appearing in the representation of the pupil in the image will be difficult or impossible to identify because the intensity of the representation of the pupil itself in the image will be the same or near the intensity of the representation of the glints on the representation of the pupil in the image.

The second exposure time is limited 765 such that an absolute value of the difference between the second exposure time and the first exposure time is equal to or below an exposure time change limit before the second exposure time is applied to the image sensor when capturing a further image. The amount of the change of exposure time is limited in order to reduce the risk of changing the exposure time too much such that the exposure time needs to be change back the exposure time back.

Figure 8:
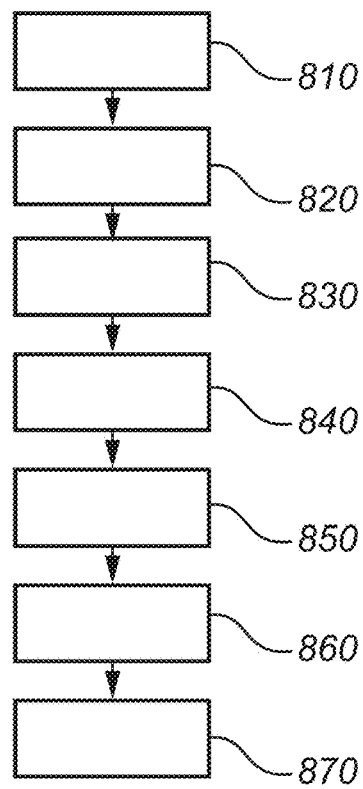

FIG. 8 shows a method of controlling exposure time according to another embodiment. An image of an eye is received 810 from an image sensor, the image resulting from the image sensor detecting light during a first exposure time. A pupil intensity is determined 820 as an intensity of a representation of a pupil of the eye in the image and an iris intensity is determined 830 as an intensity of a representation of an iris of the eye in the image. Furthermore, a pupil-iris contrast is determined 840 as a contrast between the representation of the pupil in the image and the representation of the iris in the image. On a condition that the iris intensity is determined to meet an iris intensity condition, an iris intensity compensated exposure time is determined 850 which is different from the first exposure time, and on a condition that the pupil-iris contrast is determined to meet a contrast condition, a contrast compensated exposure time is determined 860 which is different from the first exposure time. Furthermore, a second exposure time is set 870 based on any determined iris intensity compensated exposure time and any determined contrast compensated exposure time.

A person skilled in the art realizes that the present invention is by no means limited to the preferred embodiments described above. On the contrary, many modifications and variations are possible within the scope of the appended claims. For example, the person skilled in the art realizes that the methods described herein may be performed by many other eye/gaze tracking systems than the example eye/gaze tracking system 100 shown in FIG. 1, for example using multiple illuminators and multiple image sensors. Furthermore, the methods in relation to FIGS. 6-8 have been described for one eye. However, a person skilled in the art realizes that the methods may be performed for two eyes also where the result for both eyes is taken into account in each step.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

The invention claimed is:

1. A method of controlling exposure time comprising:
    receiving an image of an eye from an image sensor, the image resulting from the image sensor detecting light during a first exposure time;
    determining a pupil intensity as an intensity of a representation of a pupil of the eye in the image;
    determining an iris intensity as an intensity of a representation of an iris of the eye in the image;
    determining a pupil-iris contrast as a contrast between the representation of the pupil in the image and the representation of the iris in the image;
    on a condition that the pupil intensity is determined to meet an intensity condition, determining an intensity compensated exposure time which is different from the first exposure time;
    on a condition that the pupil-iris contrast is determined to meet a contrast condition, determining a contrast compensated exposure time which is different from the first exposure time;
    setting a second exposure time based on any determined intensity compensated exposure time and any determined contrast compensated exposure time; and
    limiting the second exposure time such that an absolute value of the difference between the second exposure time and the first exposure time is equal to or below an exposure time change limit.

2. The method of claim 1, wherein the second exposure time is set as the shorter of any determined intensity compensated exposure time and any determined contrast compensated exposure time.

3. The method of claim 1, wherein determining a pupil intensity as an intensity of a representation of a pupil of the eye in the image comprises:
    sampling pupil pixel intensity values of the image relating to pixels of a peripheral region of a representation of the pupil in the image bordering on the representation of the iris in the image; and
    determining a pupil intensity as a mean of at least a subset of the sampled pupil pixel intensity values; and
    wherein determining an iris intensity as an intensity of a representation of an iris in the image comprises:
    sampling iris pixel intensity values of the image relating to pixels of a peripheral region of a representation of the iris in the image bordering on the representation of the pupil in the image; and
    determining an iris intensity as a mean of at least a subset of the sampled iris pixel intensity values.

4. The method of claim 3, wherein the at least a subset of the sampled pupil pixel intensity values is a predetermined percentage of the sampled pupil pixel intensity values having lowest intensity values.

5. The method of claim 3, wherein the at least a subset of the sampled iris pixel intensity values is a predetermined percentage of the sampled iris pixel intensity values having lowest intensity values.

6. The method of claim 1, wherein on a condition that the pupil intensity is determined to meet an intensity condition, determining an intensity compensated exposure time which is different from the first exposure time comprises:
    on a condition that the pupil intensity is determined to be above a first intensity threshold, determining an intensity compensated exposure time that is shorter than the first exposure time by a predetermined decrement, wherein the first intensity threshold is set such that intensities above the first intensity threshold indicate saturation; and on a condition that the pupil intensity is determined to be below the first intensity threshold and above a second intensity condition threshold, determining an intensity compensated exposure time that is shorter than the first exposure time, wherein a quotient between the intensity compensated exposure time and the first exposure time is proportional to the quotient between the second intensity threshold and the pupil intensity.

7. The method of claim 1, wherein on a condition that the pupil-iris contrast is determined to meet a contrast condition, determining a contrast compensated exposure time which is different from the first exposure time comprises:

on a condition that the pupil-iris contrast is determined to be above a contrast threshold, determining a contrast compensated exposure time which is shorter than the first exposure time; and on a condition that the pupil-iris contrast is determined to be below the contrast threshold, determining a contrast compensated exposure time which is longer than the first exposure time.

8. The method of claim 1, wherein a quotient between the contrast compensated exposure time and the first exposure time is proportional to the quotient between the contrast threshold and the pupil-iris contrast.

9. The method of claim 1, wherein determining a pupil-iris contrast as a contrast between the representation of the pupil in the image and the representation of the iris in the image comprises:

determining a pupil-iris contrast as an absolute value of a difference between the pupil intensity and the iris intensity.

10. The method of claim 1, wherein the pupil intensity is higher than the iris intensity.

11. The method of claim 1, further comprising:

on a condition that the iris intensity is determined to meet an iris intensity condition, determining an iris intensity compensated exposure time which is different from the first exposure time; and setting the second exposure time is further based on any determined iris intensity compensated exposure time.

12. An eye tracking system comprising a circuitry configured to perform the method of:

receiving an image of an eye from an image sensor, the image resulting from the image sensor detecting light during a first exposure time;

determining a pupil intensity as an intensity of a representation of a pupil of the eye in the image;

determining an iris intensity as an intensity of a representation of an iris of the eye in the image;

determining a pupil-iris contrast as a contrast between the representation of the pupil in the image and the representation of the iris in the image;

on a condition that the pupil intensity is determined to meet an intensity condition, determining an intensity compensated exposure time which is different from the first exposure time;

on a condition that the pupil-iris contrast is determined to meet a contrast condition, determining a contrast compensated exposure time which is different from the first exposure time;

setting a second exposure time based on any determined intensity compensated exposure time and any determined contrast compensated exposure time; and limiting the second exposure time such that an absolute value of the difference between the second exposure time and the first exposure time is equal to or below an exposure time change limit.

13. One or more computer-readable storage media storing computer-executable instructions that, when executed by a computing system that implements eye/gaze data processing, cause the computing system to perform the method of:

receiving an image of an eye from an image sensor, the image resulting from the image sensor detecting light during a first exposure time;

determining a pupil intensity as an intensity of a representation of a pupil of the eye in the image;

determining an iris intensity as an intensity of a representation of an iris of the eye in the image;

determining a pupil-iris contrast as a contrast between the representation of the pupil in the image and the representation of the iris in the image;

on a condition that the pupil intensity is determined to meet an intensity condition, determining an intensity compensated exposure time which is different from the first exposure time;

on a condition that the pupil-iris contrast is determined to meet a contrast condition, determining a contrast compensated exposure time which is different from the first exposure time;

setting a second exposure time based on any determined intensity compensated exposure time and any determined contrast compensated exposure time; and limiting the second exposure time such that an absolute value of the difference between the second exposure time and the first exposure time is equal to or below an exposure time change limit.

* * * * *